July 29, 1958  B. H. SHORT  2,845,608
TURN SIGNAL SYSTEM
Filed Oct. 13, 1954

INVENTOR
Brooks H. Short
BY
Paul Fitzpatrick
ATTORNEY

United States Patent Office 2,845,608
Patented July 29, 1958

2,845,608

TURN SIGNAL SYSTEM

Brooks H. Short, Anderson, Ind., assignor to General Motors Corporation, a corporation of Delaware Application October 13, 1954, Serial No. 462,044

8 Claims. (Cl. 340—81)

My invention relates to signaling systems, and is particularly adapted to use for turn signals by which the operator of a motor vehicle advertises his intention of turning right or left.

The principal object of the invention is to eliminate the complicated mechanical arrangements which are customary in direction signal systems. A further object of the invention is to provide for more convenient actuation of the signal by the operator of the vehicle, preferably by providing thumb-operated switches on the spokes of the steering wheel instead of the usual lever on the steering column.

Figure 1:
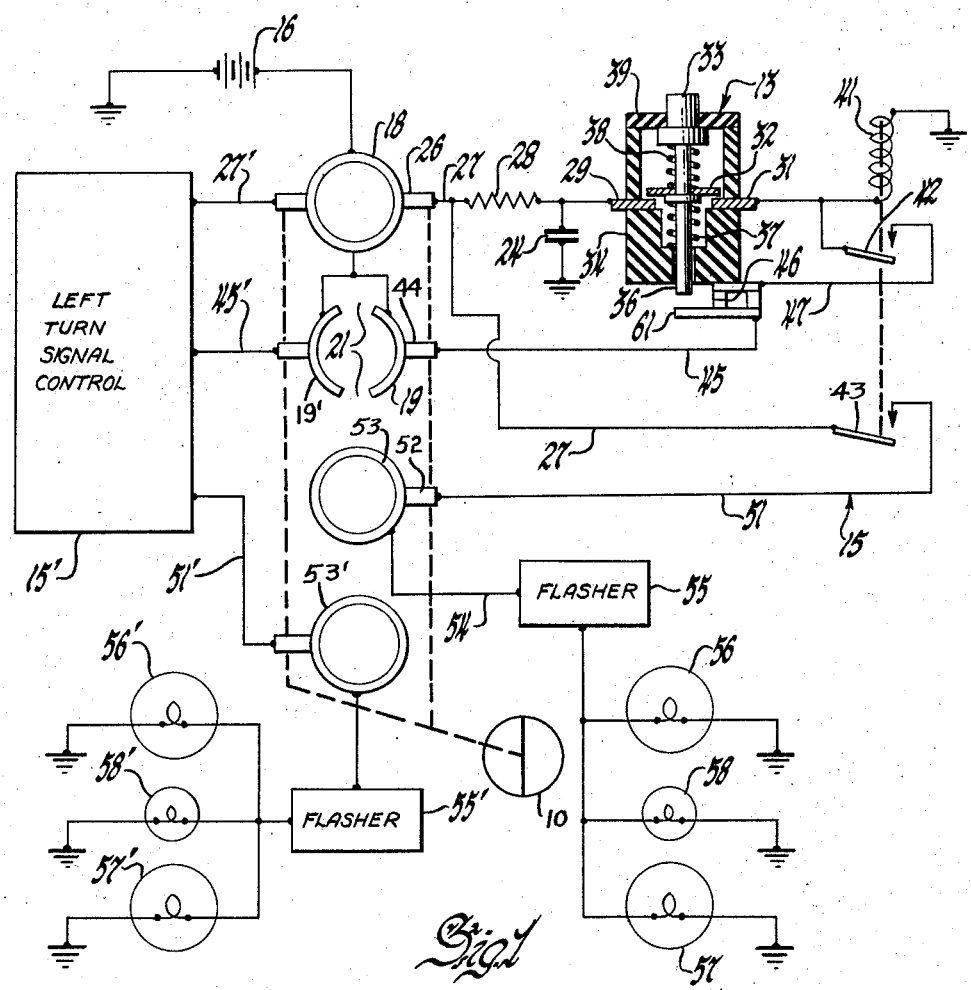
Figure 2:
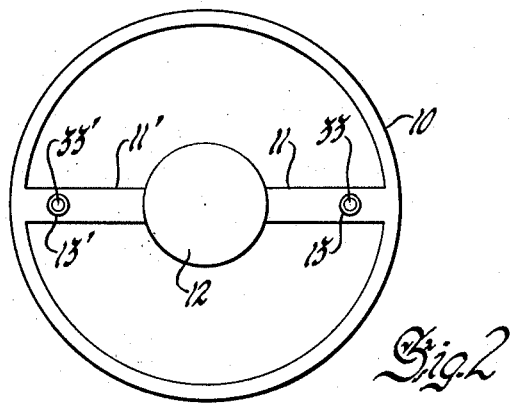

The nature of the invention, the advantages thereof, and the manner in which the objects are realized will be apparent from the succeeding description of the preferred embodiment of the invention and the accompanying drawings in which:

Figure 1 is a circuit diagram of a turn signal system embodying the invention; and Figure 2 is a view of a steering wheel illustrating the mounting of the push button switches thereon.

Referring first to Figure 2, there is illustrated a steering wheel comprising a rim 10, spokes 11 and 11', and a hub 12, which may be of suitable construction and be mounted on a steering column and connected to a steering shaft in any usual manner. Manually operable push button switches 13 and 13' are mounted on the spokes of the steering wheel, switch 13 on the right spoke operating the right turn signals, and switch 13' on the left spoke, the left turn signals.

Since the right and left turn signal installations are identical, only the right turn system will be described in detail and parts of the left turn system corresponding to those of the right turn system will be identified by corresponding reference numerals distinguished by primes. Referring now to Figure 1, the right turn signal control circuit 15 is shown in detail and the major part of the left turn signal control is indicated by the box 15'. The system is energized by a battery or other source 16 connected to slip ring 18, one of a set of stationary slip rings by which the parts on the rotatable steering wheel are coupled to the circuits in the vehicle. This set includes also a divided slip ring having gaps 21, the two segments 19, 19' of the ring being connected to the battery. The battery charges a condenser 24 through slip ring 18, brush 26 on the steering wheel, lead 27 and 200 ohm resistor 28. The charged plate of the condenser is connected to contact 29 of switch 13. Contact 29 may be connected to contact 31 by a normally open bridging contact 32 actuated by a push button 33. Switch 13 includes a housing 34 within which the push button 33 and its stem 36 are slidable against the bias of a compression spring 37 mounted between the bottom of the housing and a shoulder on the stem 36. The bridging contact 32 is urged against the shoulder by a compression spring 38 which abuts a shoulder of the push button 33. The upper side of the shoulder engages the cap 39 of the switch housing.

Depression of the button 33 causes contact 32 to bridge contacts 29 and 31, grounding charged condenser 24 through relay coil 41 which is of 100 ohm resistance. The discharge current of the condenser energizes the relay to close its front contacts 42 and 43. Contact 42 sets up a holding circuit for the relay from the battery through slip ring segment 19, brush 44, lead 45, normally closed contacts 46 mounted on the switch housing 34, lead 47, contacts 42, and relay coil 41 to ground. Relay coil 41 remains energized until this holding circuit is broken at brush 44 or contacts 46, and push button 33 may be released.

Relay 41 energizes the circuit to the right turn signal and pilot lights through a flasher of suitable type, this circuit extending from the constantly energized brush 26 through lead 27, contacts 43, lead 51, brush 52, slip ring 53, lead 54, flasher 55, and to ground through the front signal lamp 56, the rear signal lamp 57, and a pilot light 58.

If the operator changes his purpose, he may cancel or terminate the signal by pushing the button 33 through a greater stroke so that the end of stem 36 engages the operating arm 61 of contacts 46 to open these contacts and thus open the holding circuit of relay 41. It may be noted that this action again completes the circuit through contact 32 with the result that condenser 24 discharges instantaneously, after which the battery potential is divided between 200 ohm resistor 28 and 100 ohm coil 41. There is thus only one third of battery potential available for coil 41, which is not sufficient to hold contacts 42 and 43 closed. The holding circuit is thus open at contacts 42 when contacts 46 reclose. When contacts 29 and 31 open upon further upward movement of the push button, condenser 24 recharges and remains charged until further actuation of the push button.

It is desirable to cancel the signal when the turn is made by the vehicle. This may be effected by any automatic switch which opens the holding circuit of relay 41 upon rotation of the steering wheel. A very simple form of such a device is illustrated in which brush 44 normally engages the middle of segment 19 with the steering wheel in its normal position. Upon rotation of the steering wheel approximately 90°, brush 44 reaches the gap 21 to break the relay holding circuit and deenergize the signal lights at contact 43. If it is desired to hold the turn signals in operation until completion of the turn, any suitable switch which is opened only upon return movement of the steering wheel may be substituted for the contact segment 19 and brush 44.

It will be apparent that the circuit by which the left turn signal and pilot lights 56', 57' and 58' are energized is identical to that previously described, and operates in the same manner through actuation of the push button 33' mounted on the left hand spoke. It will be understood that in the installation illustrated, resistor 28, condenser 24, and relay 41 are mounted within the spokes or hub of the steering wheel on the rotating structure to minimize the number of slip rings needed.

The description herein of the preferred embodiment of the invention for the purpose of explaining the principles thereof is not to be regarded as limiting the invention, as many modifications of the structure may be made within the scope of the invention by the exercise of skill in the art.

I claim:

1. A signal system comprising a relay including a relay coil, a circuit including in series a source of potential, a resistor, a normally open switch, and the relay coil, and a condenser connected to the series circuit between the resistor and switch for charging from the source of potential and for discharge through the relay coil to actuate the relay when the normally open switch is closed, the resistor being of sufficient resistance to hold the current through the resistor and relay coil created by the potential of the source to a value below that required to hold the relay.

2. A signal system comprising a manually movable member having a rest position, a normally open switch connected to the member so as to be closed by movement of the member from the rest position, a normally closed switch connected to the member so as to be opened by further movement of the member from the rest position, a circuit including in series a charged condenser, the normally open switch, and a relay coil, a holding circuit for the relay coil including a contact closed by energization of the coil and the normally closed switch, a circuit energized by the relay coil, a current source, and means responsive to opening of the normally open switch for charging the condenser from the source.

3. A signal system comprising a manually movable member having a rest position, a normally open switch connected to the member so as to be closed by movement of the member from the rest position, a normally closed switch connected to the member so as to be opened by further movement of the member from the rest position, a circuit including in series a source of potential, a resistor, the normally open switch, and a relay coil, a condenser charged through the resistor adapted to discharge through and energize the relay coil when the normally open switch is closed, a holding circuit for the relay coil including a contact closed by energization of the coil and the normally closed switch, and a circuit energized by the relay coil.

4. A signal system comprising a manually movable member having a rest position, a normally open switch connected to the member so as to be closed by movement of the member from the rest position, a normally closed switch connected to the member so as to be opened by further movement of the member from the rest position, a relay including a relay coil, a circuit including in series a source of potential, a resistor, the normally open switch, and the relay coil, a condenser charged through the resistor adapted to discharge through the relay coil and actuate the relay when the normally open switch is closed, the resistor being of sufficient resistance to hold the current through the resistor and relay coil created by the potential of the source to a value below that required to actuate the relay, a holding circuit for the relay coil including a contact closed by actuation of the relay and the normally closed switch, and a circuit energized by the relay.

5. A signal system comprising a manually movable member having a rest position, a normally open switch connected to the member so as to be closed by movement of the member from the rest position, a normally closed switch connected to the member so as to be opened by further movement of the member from the rest position, a relay including a relay coil, a circuit including in series a source of potential, a resistor, the normally open switch, and the relay coil, a condenser charged through the resistor adapted to discharge through the relay coil and actuate the relay when the normally open switch is closed, a holding circuit for the relay coil including a contact closed by actuation of the relay and the said normally closed switch, and a circuit energized by the relay coil.

6. A direction signal system comprising a steering wheel, a manually movable member having a rest position, a normally open switch connected to the member so as to be closed by movement of the member from the rest position, a normally closed switch connected to the member so as to be opened by further movement of the member from the rest position, a circuit including in series a source of potential, a resistor, the normally open switch, and a relay coil, a condenser charged through the resistor adapted to discharge through and energize the relay coil when the normally open switch is closed, a holding circuit for the relay coil including a contact closed by energization of the coil, the said normally closed switch, and a switch responsive to movement of the steering wheel, and a direction signal energized by the relay coil.

7. A signal system comprising a manually movable switch actuator having a rest position, a normally open switch connected to the actuator so as to be closed by movement of the actuator from the rest position, a normally closed switch connected to the actuator so as to be opened by further movement of the actuator from the rest position, a circuit energized by closure of the normally open switch, means actuated by closure of the normally open switch to maintain the signal energized after the normally open switch reopens, means actuated by opening of the normally closed switch to de-energize the circuit, and additional manually operable means to de-energize the circuit.

8. A direction signal system comprising a steering wheel, a manually movable switch actuator on the steering wheel having a rest position, a normally open switch connected to the actuator so as to be closed by movement of the actuator from the rest position, a normally closed switch connected to the actuator so as to be opened by further movement of the actuator from the rest position, a turn signal energized by closure of the normally open switch, means actuated by closure of the normally open switch to maintain the signal energized after the normally open switch reopens, means actuated by opening of the normally closed switch to de-energize the signal, and means actuated by movement of the steering wheel to de-energize the signal.

References Cited in the file of this patent

UNITED STATES PATENTS

| 1,808,683 | Rooney | June 2, 1931 |
| 2,401,991 | Walton | June 11, 1946 |
| 2,427,751 | Snyder | Sept. 23, 1947 |
| 2,589,410 | Leete | Mar. 18, 1952 |

FOREIGN PATENTS

| 177,105 | Switzerland | Aug. 1, 1935 |